INVENTORS
ROBERT C. WARREN,
WESLEY J. BARROW,
BY

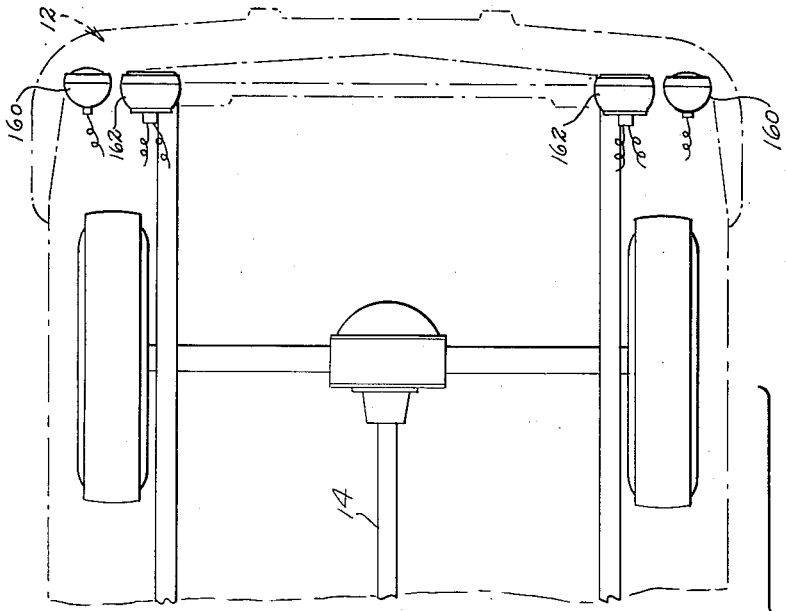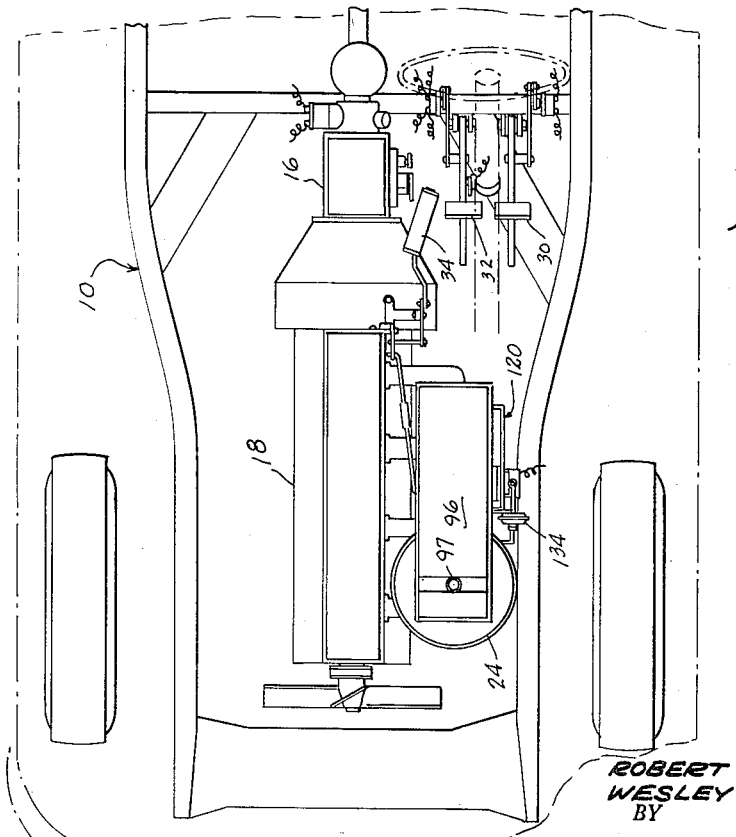

McMorrow, Berman + Davidson
ATTORNEYS.

Oct. 2, 1956 R. C. WARREN ET AL 2,764,962
VACUUM SELECTOR OPERATED SAFETY SIGNAL
DEVICE FOR AUTOMOTIVE VEHICLES
Filed Jan. 15, 1954 5 Sheets-Sheet 3
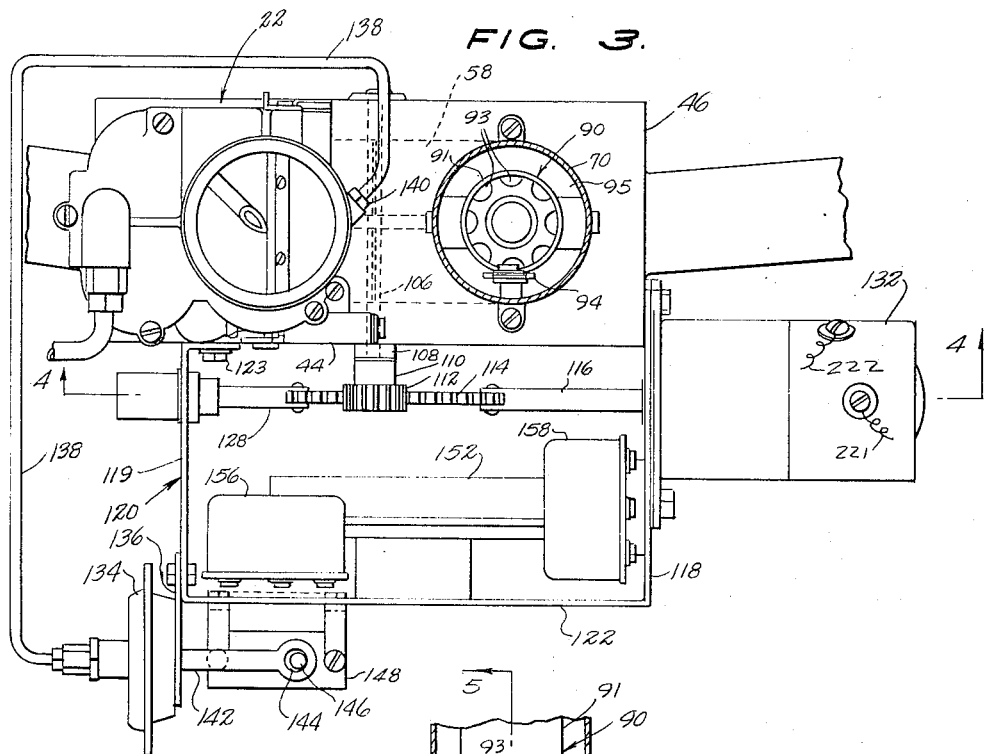
INVENTORS.
ROBERT C. WARREN,
WESLEY J. BARROW,
BY
McMorrow, Berman & Davidson
ATTORNEYS.

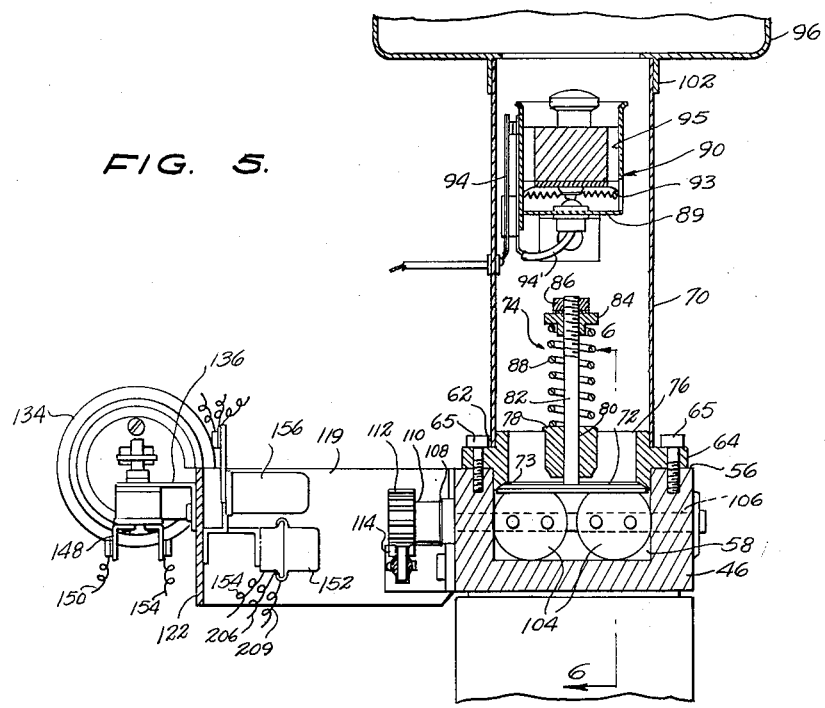
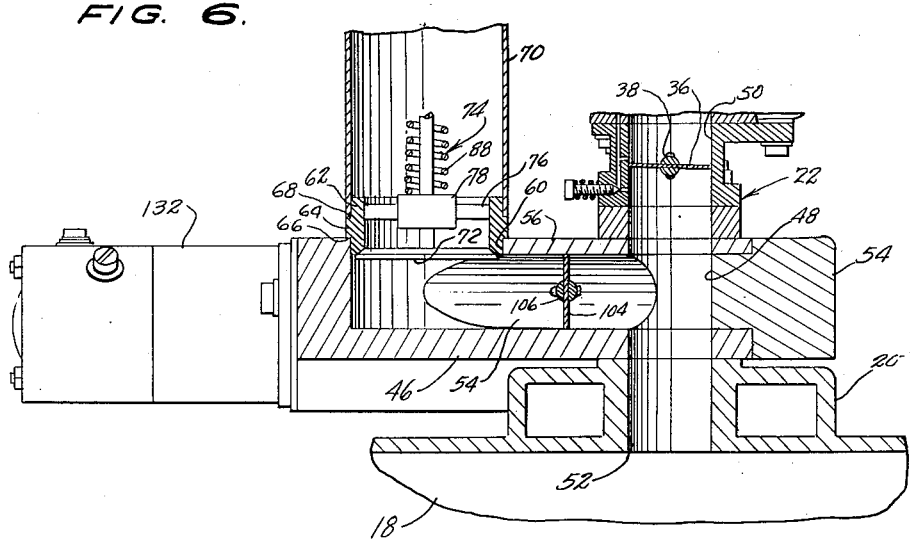

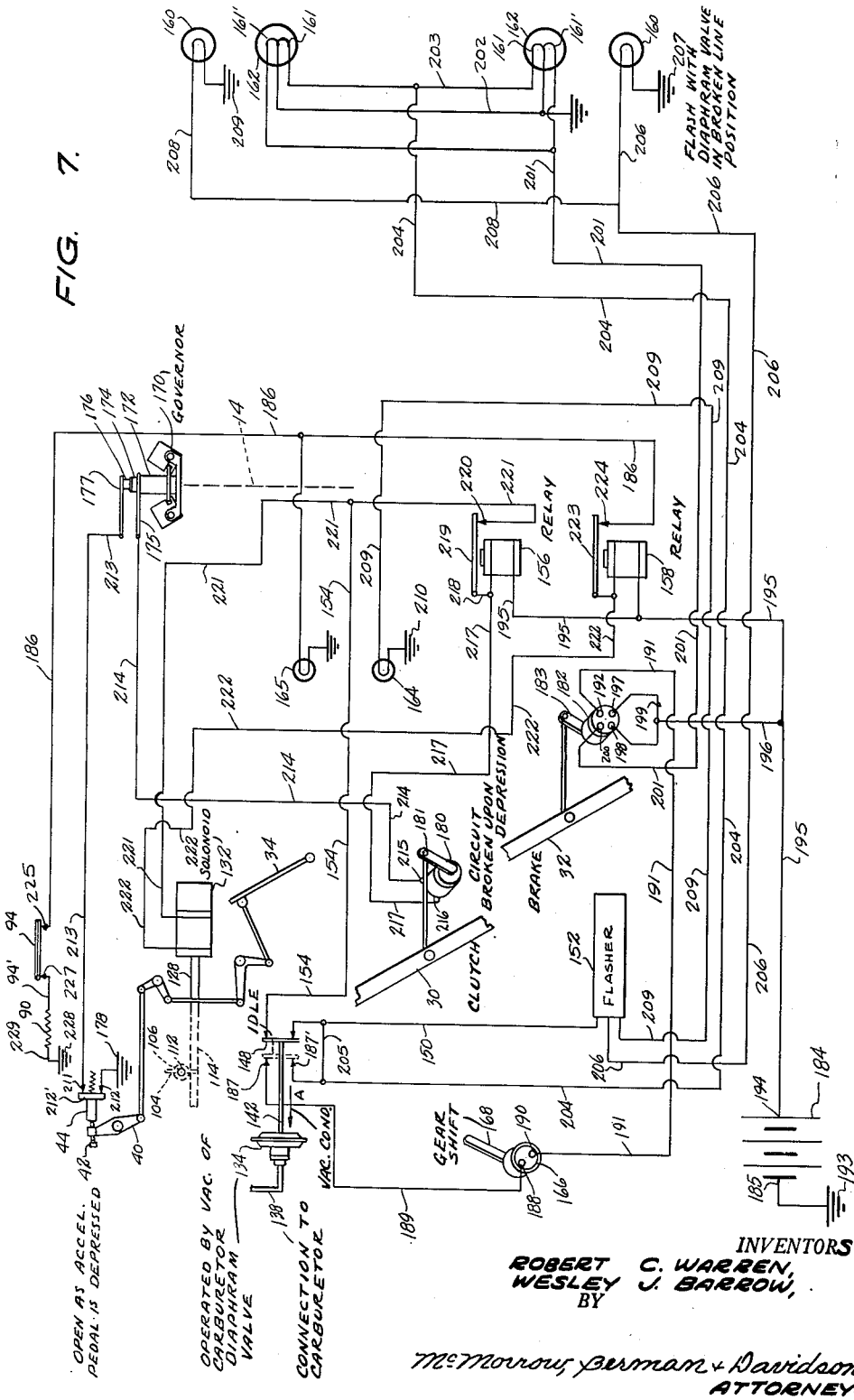

United States Patent Office 2,764,962
Patented Oct. 2, 1956

2,764,962
VACUUM SELECTOR OPERATED SAFETY SIGNAL DEVICE FOR AUTOMOTIVE VEHICLES

Robert C. Warren and Wesley J. Barrow,
Johnson City, N. Y.

Application January 15, 1954, Serial No. 404,264

3 Claims. (Cl. 123—97)

This invention relates to automotive vehicles and more particularly to a vacuum selector operated safety device therefor.

It is an object of this invention to provide a safety signal device for automotive vehicles which is entirely automatic in operation and which will signal by flashing lights to vehicles behind the vehicle upon which the device is installed that the operator of the device-carrying vehicle is reducing his speed of forward motion.

It is another object of this invention to provide a safety signal device which will operate when the operator of the vehicle upon which it is installed lifts his foot from the accelerator pedal thereby cutting the flow of fuel into the motor thereby warning drivers of vehicles behind the device-carrying vehicle that a deceleration is contemplated.

It is yet another object of this invention to provide an automatic signal device which is operated from a vacuum selector in response to the change from compression to vacuum during motor operation and vice versa.

Another and still further object of the invention is to provide an automatically operated safety signal device which is not only responsive to movement of the accelerator pedal but is placed in operation when the gear shift lever is moved, the brake is depressed and which will operate automatically when the vehicle is traveling at low forward or rearward speeds in the nature of ten miles per hour or less.

Another and still further object is the provision of the vacuum selector to which the signal device is responsive, the vacuum selector so operated as to define an economizer for fuel consumption whereby excessive oil consumption, excessive fuel consumption and the deposit of carbon in various parts of the motor will be eliminated. The vacuum selector or economizer permitting air free of petroleum products to enter the motor cylinders when the operator of the vehicle is not feeding fuel into the motor by depressing the accelerator pedal, thus changing vacuum to compression.

Hence, the primary object of this invention is to contribute to safer operation of automotive vehicles by employment of the automatically operated safety signal device and the vacuum selector which operates the safety signals defining an economizer which effects a saving in fuel and oil consumption.

The above and other objects and advantages will become apparent from the following detailed description, forming the specification, taken in conjunction with the accompanying drawings, wherein:

Figure 1 is a partial view of an automobile chassis showing the device embodying the present invention associated therewith;

Figure 3 is a cross sectional view taken on line 3—3 of Figure 2;

Figure 4 is a cross sectional view taken on line 4—4 of Figure 3;

Figure 5 is a cross sectional view taken on line 5—5 of Figure 4;

Figure 6 is a cross sectional view taken on line 6—6 of Figure 5; and

Figure 7 is a wiring diagram employed with the device of the present invention.

Figure 2:
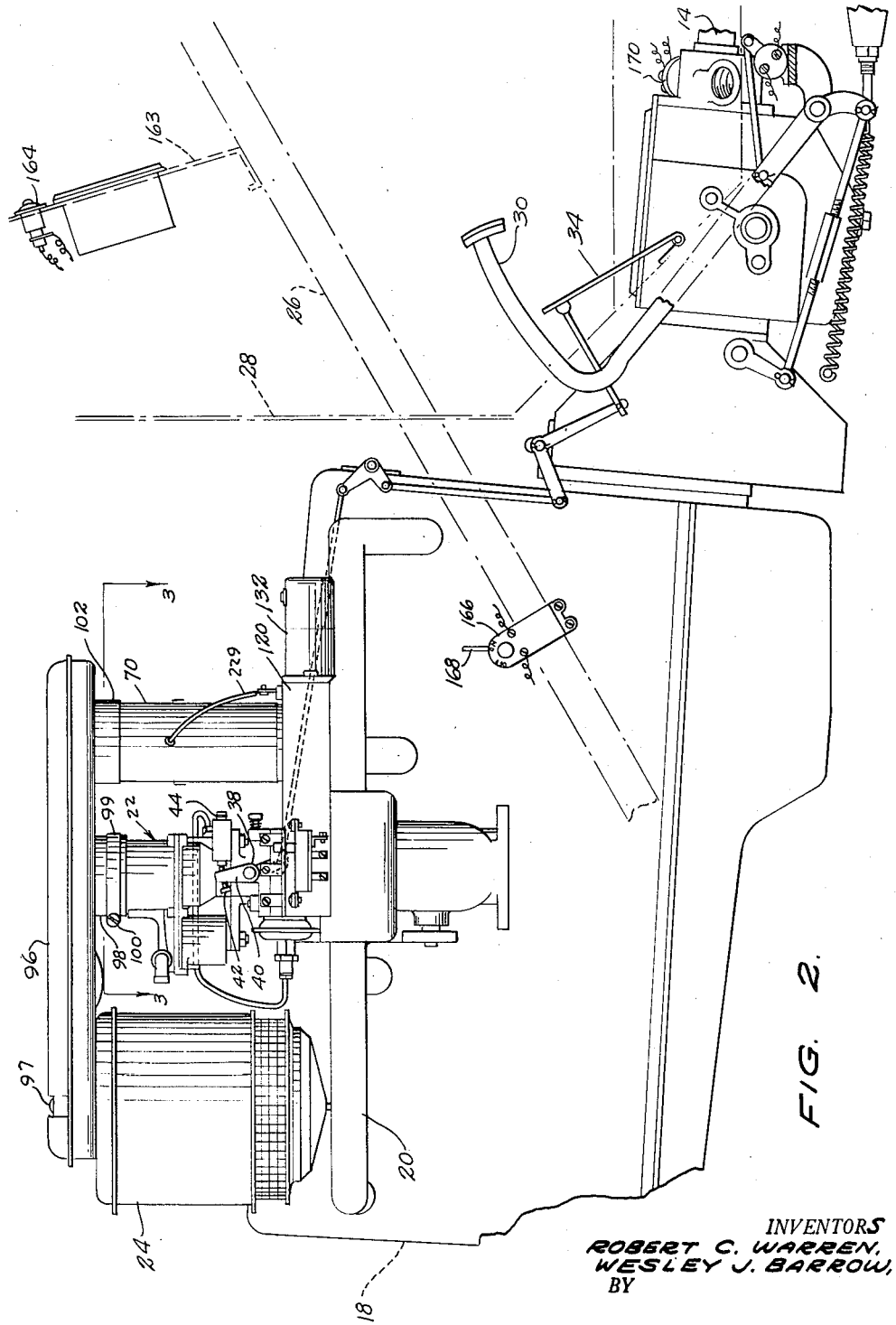
Figure 2 is a side elevational view of a portion of an automotive vehicle showing the device of this invention in operative relation to the automotive vehicle elements shown.

With continued reference to the drawings, in Figure 1 there is shown the chassis, generally indicated at 10, of an automotive vehicle partially shown in broken lines and generally indicated at 12. The vehicle 12 is conventionally provided with a drive shaft 14, a transfer case 16 operative in response to a gear shift lever (not shown) and also operatively connected to a motor 18, the motor 18 being provided with the usual manifold 20 and a carburetor generally indicated at 22 having an air filter 24 associated therewith. The steering column of the automotive vehicle is indicated at 26 extending through a fire wall 28 dividing the motor from the interior or cab portion of the vehicle. The interior of the cab portion of the vehicle at the driver's side has the usual clutch pedal 30, brake pedal 32 and accelerator or gas pedal 34 extending therein for manipulation by the driver or operator of the vehicle. The usual linkage operatively connects the accelerator pedal 34 with the throttle valve of the carburetor 22, the throttle valve is mounted for rotational movement about the throttle valve shaft 38 which extends through the housing of the carburetor 22 and slightly therebeyond at one end, and has mounted on its extended end beyond the carburetor housing an arm 40 mounted for rotational movement thereon at one end of the arm so that the arm 40 moves with the butterfly or throttle valve 36. The other end of the arm 40 remote from its connection to the shaft 38 carries an adjusting screw 42 threadingly received therein and extending therethrough in a suitable threaded opening provided at that end of the arm 40. The end of the screw or bolt 42 remote from the head thereof is adapted to contact a normally open switch 44 mounted in any suitable manner upon the carburetor housing. As will be seen in Figures 2 and 7, the bolt 42 will be so adjusted as to contact the switch 44 when the accelerator pedal 34 is in its normal or undepressed position, and upon depression of the accelerator 34 to open the throttle valve 36, the arm 40 will move with the shaft 38 of the throttle valve so as to move the arm 40 along with the rotation of the shaft 38 thereby causing the bolt 42 to move away from the switch 44 and break contact therewith.

Interposed between the lower end of the carburetor 22 and the manifold 20 is the body portion 46 of the vacuum selector or economizer. The body 46 is formed in the shape of a rectangular block extending longitudinally of the motor 18 and parallel with the longitudinal center line of the manifold 20 with the one end of the body 46 adjacent the carburetor 22 and the body extending perpendicularly to the vertical center line of the carburetor 22 toward the fire wall 28, the body 46 being mounted upon the manifold 20 so as to be carried thereby. As best seen in Figures 4 and 6, the body 46 is provided with a transverse opening 48 therethrough in registry with one end with the opening or passage 50 of the carburetor 22 and at its other or lower end with the fuel intake opening 52 of the manifold 20. It should be noted that the body 46 extends slightly beyond the carburetor 22 at the end thereof remote from the fire wall 28 and is provided at its end remote from the fire wall 28 with a solid block 54 (Figure 6) forming a closure or cap at that end of the body and defining a portion of the opening 48 through the body 46. As shown in Figure 6, the lower end of the carburetor rests directly upon the upper horizontal surface 56 of the body 46 so that the passage 50 and openings 48 and 52 comprise a continuous conduit from the carburetor to the manifold.

With particular reference to Figures 5 and 6, the body 46 is provided with a central conduit 58 therein of generally rectangular cross sectional shape, which is in communication with the opening 48 connecting the passage 50 with the fuel intake opening 52. Adjacent the end of the body 46 remote from the carburetor 22 there is provided an opening 60 in the horizontal surface 56 so as to communicate with the end of the conduit 58 remote from its end in communication with the opening 48. A collar 62 fits within the opening 60 and is provided with an exterior annular flange 64 which provides a shoulder 66 resting upon the horizontal surface 56 of the body 46 about the periphery of the opening 60 so that the collar 62 extends within the opening 60 and a portion of the collar extends upwardly from the surface 56. The annular flange 64 also provides a shoulder 68 upon which is mounted a cylindrical pipe or tube 70 so that the tube or pipe 70 is upstanding thereon and the opening through the pipe is in communication with the end of the conduit 58 in the body 46 remote from the conduit end in communication with the opening 48. The collar 64 is secured upon the top horizontal surface 56 of the body 46 by bolts 65 passing centrally through openings provided in the flange 64 and into suitably threaded registering openings provided in the top of the body 46. The lower end of the collar 62 is inclined upwardly toward the center thereof so as to provide a seat for the head 72 of an inverted poppet valve, generally indicated at 74. The spider 76 is provided to extend transversely across the interior of the collar 62 and suitably attached thereto at the ends of the spider is contact therewith, and the center portion of the spider is somewhat enlarged to provide a hub 78 having an opening 80 centrally therethrough and along the longitudinal axis of the pipe section 70, the opening 80 receiving the stem 82 which carries the valve head 72 at its lower end and is threaded at its other end to receive a flanged nut 84 which is secured in place on the stem 82 by a lock nut 86. A spring 88 is circumposed about the stem 82 and contained between the hub 78 and the flanged portion of the flange poppet valve 74 onto its seat 73 provided on the lower nut 84 so that the spring 88 normally urges the inverted edge of the collar 62. The purpose and function of the inverted poppet valve 74 will appear later.

Positioned within the interior of the pipe section 70 and supported upon a transversely extending bracket 89 having downturned legs at its opposite ends secured to the interior of the pipe 70 above the poppet valve 74 is a heating element, generally indicated at 90 having a resistance unit 92 contained therein, the operation of the resistance unit 92 being responsive to the action of a bimetallic thermostat 94 sensitive to temperature change. A wire 94' connects the thermostat at 94 and the heater 90. The housing 91 of the heater 90 is provided with a plurality of rectangular openings 93 spaced peripherally about the lower end thereof in communication with the air passage 95 through the heater 90.

Extending across the top of the air filter 24, the top of the carburetor 22 and the top of the pipe section 70 is a duct 96 having depending flanges which communicate the interior of the duct 96 with the filter, carburetor and pipe section respectively. The duct 96 is generally rectangular in cross section having the usual hollow interior and extends from adjacent one end of the filter 24 to slightly beyond the pipe section 70. The flange or neck which connects the air passage through the filter with the duct interior is not shown but is of the conventional type and the duct 96 is secured upon the filter 24 as by a screw or nut 97. The neck or flange 98 is of such dimension and shape as to snugly embrace the upper end of the carburetor 22 so that the passage 50 thorugh the carburetor is in communication with the interior of the duct 96. The neck 98 is secured upon the carburetor 22 by a clamp 99 extending about the end of he neck 98 remote from the duct 96 and tightened in position by the usual nut 100 bringing the free ends of the clamp together so as to tighten about the related elements. The other neck or flange 102 dependingly carried by the duct 96 adjacent its end remote from the filter 24 is adapted to encircling receive the upper end of the pipe section 70 therein so that the interior of the pipe section 70 is in communication with the interior of the duct 96.

Thus, it will be apparent that air drawn in or entering through the filter 24 will pass upwardly therethrough and enter into the hollow interior of the duct 96 so as to enter into the mixing chamber of the carburetor 22 when a vacuum is created in the manifold therein by motor operation and the throttle valve has been opened to permit the flow or fuel, or alternatively, the air passing through filter 24 and the duct 96 will, under certain conditions, flow through the pipe 70 and into the conduit 58 provided in the body 56 of the vacuum selector to enter the manifold 20 through the fuel intake opening 52 thereby by-passing the carburetor 22 entirely. In effect, the pipe 70 along with the conduit 58 at one end thereof and the extension of the duct 96 beyond the carburetor 22 define an air intake by-pass whereby the air will not enter the manifold through the carburetor but will follow the path through the pipe 70 and the conduit 58 and thus enter into the manifold 20.

In order for the air to by-pass the carburetor 22, it is necessary to open the throttle type auxiliary valves 104 normally tending to close the conduit 58 in the body 46, the auxiliary valves 104 being arranged in side by side relation and mounted for rotational movement upon a common shaft 106 extending transversely of the conduit 58 and journaled at one end in the body 46 and having its other end extending therethrough, the end of the shaft 106 extending through the body 46 is supported in a bearing collar 108 carried by the adjacent side of the body 46 and extending therethrough and through a spacer collar 110 which is in abutting relation to the bearing 108 on the side thereof remote from the body 46. The shaft 106 carries at its terminal end extending beyond the spacer collar 110, a gear 112 which is in mesh with a geared rack 114. Rack 114 is secured at one end in the bifurcation of an arm or rod 115 which is received in a sleeve bearing 116 carried by one leg 118 of a U-shaped bracket, generally indicated at 120, and secured at its free end to the body 46 of the vacuum selector unit. The other leg 119 extends generally parallel to the leg 118 and spaced therefrom the bight portion 122, the free end of the leg 119 having an inturned foot through which a bolt 123 is passed so as to secure the leg 119 upon the adjacent portion of the carburetor which the inturned foot of the leg 119 overlies. As will be clearly seen in Figure 3, the bracket 120 extends laterally from the body 46 and carburetor 22 with the bight 122 thereof lying in a longitudinal plane generally parallel with the longitudinal plane through the body 46.

Turning attention once again to the arm 115 secured at one end to the adjacent end of the rack 114, it will be seen that the arm or rod 115 is slidingly received within the opening 117 through the sleeve bearing 116. The sleeve bearing has a reduced threaded portion 124 forming the end thereof adjacent the rack 114 and is received in an opening 125 provided in the leg 118 of the bracket 120 and a nut 126 is received on the threaded reduced portion 124 and tightened thereon so as to secure the sleeve bearing 116 on the leg 118, as clearly shown in Figure 4.

An arm or rod 128, similar to the arm or rod 116 attaches to the end of the rack 114 remote from the rod 116 by entering a forked or bifurcated portion at that end of the rod 128 forming the connection with the adjacent end of the rack 114, and the usual pin or rivet passing through the bifurcation of the rod 128 and the end of the rack 114 held therebetween makes this connection secure. The arm or rod 128 extends from its connection with the adjacent end of the rack 114 through an opening 130 provided in the leg 119 of the bracket 120 and enters a solenoid 132 carried by the leg 119. The arm or rod 128 is, in effect, the plunger of the solenoid 132 and adapted for movement in a rectilinear path upon energization of the solenoid 132 thereby carrying the rack 114 in this rectilinear path of movement causing rotation of the gear 112 and the rotation of the auxiliary valves 104 mounted on the shaft 106 which is of course rotated upon rotation of the gear 112. Rotation of the auxiliary valves 104 caused by operation of the solenoid 132 will open the conduit 58 thereby permitting air entering through the filter 24, duct 96 to by-pass the carburetor 22 and enter through the pipe 70 into the conduit 58 and thence pass into the fuel intake opening 52 of the manifold 20. The conditions under which the solenoid 132 will operate and the manner in which it is energized will be brought out during the description of the operation of the safety signal device of the present invention.

With reference to Figures 3 and 5, particularly, a diaphragm valve 134 is carried upon an L-shaped bracket 136 secured upon the leg 119 of the bracket 120 adjacent the bight portion 122 and extending laterally outwardly from the bight portion 122 and on the side of the leg 119 remote from the opposite leg 118 of the bracket 120. A length of tubing 138 connects one end of the diaphragm valve to the vacuum outlet 140 provided in the carburetor 22, while the other end of the diaphragm has extending therefrom an arm 142 having an enlarged circular head with an opening 144 therethrough, and since the arm 142 is of flat stock material, the opening 144 is adapted to receive therein the post 146 of a transfer switch 148. Vacuum created within the carburetor 22 will cause the diaphragm valve 134 to operate thereby moving the arm 142 in a rectilinear path carrying the post 146 of the transfer switch 148 therewith. One wire lead 150 connects one side of the transfer switch 148 to a flasher unit 152, and a second wire lead 154 connects the other terminal of the transfer switch 148 to a relay switch 156. A second relay switch 158 is carried by the frame or bracket 120, and in this regard, the flasher unit 152 may also be carried by the frame or bracket 120. As will be seen in Figure 7, when the diaphragm valve 134 causes movement of the arm 142 in the direction of the arrow A due to the presence of a vacuum condition in the carburetor 22, the transfer switch 148 will be moved from the solid line position to the broken line position of Figure 7. While in the solid line position shown in Figure 7, the transfer switch 148 will act upon one section of the electrical circuit so as to make possible the blinking of "caution" or "slow" lights 160 mounted on the rear of the vehicle and also to light the weaker of the bulbs 161 in the conventional tail light 162. At the time the caution lights 160 are in operation a warning light 164 mounted on a panel 163 carried by the steering column 26 will glow so as to inform the operator of the vehicle that the caution lights are in operation. In this latter connection, the panel 163 also mounts a warning light 165 having a connection into the wire 186 leading from the relay switch 158 to the thermostat 94 and heater 90, so that warning light 165 will glow when the heater is in operation.

An "on-off" switch 166 having an operating lever 168 is mounted on the lower portion of the steering column 26, the lever of switch 166 is operatively connected to the gear shift lever (not shown) of the vehicle in any suitable manner so that when the gear shift lever is moved to any position other than "neutral," the lever 168 will move to the "on" position. Return of the gear shift lever to the "neutral" position will cause the switch operating lever 168 to move to the "off" position. Thus, in effect, the switch 166 acts as a circuit breaker for that section of the circuit operative when the diaphragm valve has moved the transfer switch 148 to the dotted line position shown in Figure 7.

Another feature of the present device is the provision of a governor 170 of the movable weight centrifugal type carried by the drive shaft 14 and rotatable therewith. The governor 170 is responsive to the predetermined centrifugal force resulting from rotation of the drive shaft, in the present instance, when the vehicle is moving in excess of ten miles per hour, will cause a collar 172 operatively associated therewith to move the contact 174 carried on a contact arm 175 into engagement with contact 176 carried by contact arm 177 so as to provide a connection to the ground connection 178 to complete that section of the electrical circuit placed in condition to operate the "caution" lights 160 when the transfer switch 148 is in the solid line position shown in Figure 7.

The normally closed switch 180 is included in the circuit and has a lever or arm 181 operatively connected to the clutch pedal 30 so that upon depressing the clutch pedal 30, the switch 180 will act as a circuit breaker to stop operation of the caution lights 160, if these caution lights are operating. A switch 182, included in the present circuit, is operatively connected to the brake pedal 32. Upon depression of the brake pedal 32, the switch which is normally closed with respect to the caution lights 160 and open with respect to either of the bulbs in the tail lights 162, will cause current from the source of current for the entire circuit, storage battery 184, to flow to the weaker of the bulbs in the tail lights 162 to thereby illuminate them, the switch 182 will continue to be closed with regard to the caution lights circuit even when the pedal 32 is depressed. Switch 182 is provided with an operating arm or lever 183, similar to the arm or lever 181 of the switch 180, and movable in response to depression of the pedal 32 to cause the brake or weaker lights of the tail lights 162 to be illuminated.

In operation, the operator starts the motor of his vehicle, the gear shift lever is then moved from its "neutral" position. This movement of the gear shift lever causes the operating lever 168 of the switch 166 to move from the "off" to the "on" position. With the motor idling, the vacuum is operating in the carburetor 22 causing the diaphragm valve 134 to move the transfer switch 148 to the position shown in broken lines in Figure 7 thereby placing into operation one section of the circuit to cause the caution lights 160 to flash as will presently appear.

This section of the circuit which causes caution lights 160 to flash includes the terminal 187 on the transfer switch 148, terminal 187 is connected to one terminal 188 of the switch 166 by wire 189 and the other terminal 190 is in contact with the terminal 188 since the lever 168 has been moved to the "on" position. Wire 191 leads from terminal 190 to the terminal 192 on the switch 182. Current from the battery 184, which has one terminal 185 connected to ground as at 193, flows from the terminal 194 through wire 195. A wire 196 is joined to the wire 195 and causes current from the battery to flow into the terminals 197 and 198 of switch 182 through the wire 199. The switch 182 is so set that whether the pedal 32 is depressed or raised, current will pass from the terminal 197 to terminal 200 so that the weaker of the bulbs in the tail lights 162 will glow when the transfer switch 148 engages the terminals 187 and 187', since terminal 200 is connected to the weaker bulbs by wires 201 and 202. As the brake pedal 32 is depressed, switch 182 will permit current to flow from terminal 198 to terminal 200 thereby causing illumination of the stronger bulb 161' in each of the lamps 162. The terminal 187' is connected into the wire interconnecting the weaker of the bulbs 161 by wire 204 thus completing the circuit to the weaker set of bulbs 161.

A wire 205 connects wires 204 and 150 adjacent the transfer switch 148 so as to hook the section of the circuit operative when transfer switch is in the dotted line position of Figure 7 into the flasher unit 152 since wire 150 is connected into the flasher unit. Wire 206 is connected to the flasher 152 at one end and to one of the caution lights 160 at its other end, this caution light being grounded at 207. To connect the other of the caution lights into the lead 206 from the flasher, a wire 208 is tied into the wire 206 at one end and into the other caution light at the other end, and this light is grounded at 209. Thus, this section of the circuit is completed and will cause blinking of caution lights 160 and illumination of the weaker bulbs 161 in the tail lamps 162. In addition, wire 209 connects the flasher 152 to the warning light 164 carried on the panel mounted on the steering column 26 inside the cab portion of the vehicle, and the light 164 is grounded at 210, so that when the flasher unit 152 is energized to cause the blinking of the "caution" or "slow" lights 160, the warning light 164 will be illuminated.

It should be observed that the section of the circuit just described will be operative when vacuum is present in the carburetor and the air intake by-pass not conducting the air around the carburetor. Whenever this condition prevails, such as when the motor is idling and the gear shift lever in other than "neutral" position, or under conditions of operation where vacuum is present in the carburetor and the gear shift lever is in other than "neutral" position, the section of the circuit just described will operate.

As the operator of the vehicle places the vehicle into normal driving range by depressing the accelerator pedal, the vacuum in the carburetor will be lost and the transfer switch 148 will be moved by the diaphragm valve 134 into the solid line position shown in Figure 7. Under normal driving conditions, the accelerator pedal 34 will be depressed and the transfer switch 148 in the solid line position cutting out one section of the circuit. With the accelerator pedal 34 depressed, the bolt 42 will be spaced from the normally open switch 44 so that the other section of the circuit is broken between terminals 211 and 212 of the switch 44, the terminal 212 being grounded at 178. However, upon release of pedal 34, bolt 42 will engage switch 44 causing the terminals 211 and 212 to be connected by contact bar 212' in the switch 44.

A wire 213 connects terminal 211 with the contact arm 177, and with the vehicle attaining a speed greater than ten miles per hour, the governor 170 will cause the contact 174 on contact arm 175 to engage with contact 176 on the arm 177. The contact arm 175 has one end of a wire 214 connected thereto, the other end of the wire 214 is connected onto one terminal 215 of the normally closed switch 180 operatively connected to clutch pedal 30. At this point, the previously described circuit breaker function of switch 180 will be seen more clearly, namely, the circuit will be broken at switch 180 upon depression of the clutch pedal 30.

From the other terminal 216 on the switch 180, a wire 217 connected at one end thereto is connected at its other end to one terminal 218 of the relay switch 156 to thereby cause energization thereof, with the terminals 211 and 212 closed causing contact 219 to engage with the terminal 220. Current from the battery 184 flows into switch 156 through wire 195 which connects into the switch, so that this switch 156 may be energized to move contact 219 into engagement with terminal 220, from whence a wire 221 leads to the solenoid 132, causing energization of the solenoid and the resultant movement of the rack 114, gear 112, shaft 106 and the auxiliary valves 104 to thereby open the conduit 58 so that the intake air may by-pass the carburetor 22.

At this point, with the auxiliary valves 104 open, the diaphragm valve 134 will not be able to operate even though vacuum is present in the carburetor because the carburetor will be by-passed by the intake air following the path of least resistance through the filter 34, duct 96, pipe 70, the poppet valve opened by vacuum resulting from piston operation in the motor, conduit 58 and into the fuel intake opening 52 of the manifold 20. Two things are now happening, first, the electrical circuit section operative with the transfer switch in the solid line position (Fig. 7) is in condition to have the "slow" lights 160 flash, and secondly, the intake air is by-passing the carburetor so that no petroleum product is carried by the flow of air into the manifold and, therefore, into the motor. As a consequence of the second occurrence, a considerable saving in fuel is accomplished and also less carbon will be deposited in the motor since it is known that under driving conditions where the vehicle is moving and the flow of fuel is cut from the carburetor by closing of the throttle valve, considerable carbon deposit may result in the motor. Hence, the air intake by-pass for the carburetor 22 and the body 46 with its associated elements define a vacuum selector and a fuel economizer. The operation of the vacuum selector permits and controls the operation of the circuit for flashing the "slow" lights by causing the diaphragm valve 134 to move so that either one or the other sections of the electrical circuit is placed in operative position; the opening of the auxiliary valves 104 permits a fuel free air flow into the motor and at the same time the intake air by by-passing the carburetor permits the transfer switch 148 to remain in the solid line position of Figure 7 so that section of the circuit operative during normal vehicle operation will be set to flash the "slow" lights.

With continued reference to Figure 7, the section of the circuit operative during normal vehicle operation, that is, while the vehicle is moving steadily, continues from the solenoid 132 by a wire 222 connected to the solenoid at one end and to a second relay switch 158 at its other end so that relay 158 may be energized to cause contact bar 223 to engage a terminal 224 onto which one end of the wire 186 is connected. The other end of wire 186 connected to a terminal 225 on the thermostat 94 while wire 94' connects the other terminal 227 to the heater 90 which is grounded at 228 by wire 229.

Still referring to Figure 7, it will be apparent that when the accelerator pedal 34 is depressed during ordinary vehicle operation, the terminals 211 and 212 will not be bridged by the contact bar 212' and the vacuum selector cannot function. However, when the accelerator pedal is released to its uppermost position whereby the throttle valve 36 is closed, compression of the motor changes to vacuum and the bolt 42 rotated with the throttle valve 36 will move contact bar 212' to bridge terminals 211 and 212 in the transfer switch 44 which will energize relay 156 and solenoid 132. Upon energization, solenoid 132 will cause auxiliary valves 104 to open and the inverted poppet valve 74 will be opened against the tension on spring 88 thereby permitting free flow of intake air to by-pass the carburetor, thus diaphragm valve will not be operative so that the contact between terminals 211 and 212 will be maintained and fuel free intake air will flow into the motor. The just described operation is conditioned upon the governor 170 urging engagement of contacts 174 and 176 and the clutch pedal 30 being in its raised position.

As previously pointed out, relay 156 is electrically connected to relay 158 so as to cause relay 158 to be energized upon energization of relay 156, this provides current to the thermostat 94 so that when a predetermined temperature is present in the interior of the pipe 70, the thermostat 90 will permit current to flow into the resistance unit 92 of the heater 90 to thereby warm the air flowing through the pipe 70 and through the passages in the heater 90 and out through the openings 93 in the lower end of the heater so that cold air will not be introduced into the manifold 20 and motor 18.

At the same time current will flow through the closed terminals 197 and 200 of switch 182 to cause the weaker bulbs 161 to light and the wire 154 connected to flasher 152 which in turn is hooked into the "slow" lights 160 by wires 206 and 208 will cause the lights 160 to flash, thus warning the operators of the vehicles behind that, the driver of the device equipped vehicle is decreasing his speed.

Pressure upon the accelerator pedal to open the throttle valve will cause the bar 212' to move away from terminals 111 and 112 thereby breaking the circuit and discontinuing flashing of lights 160 and turning "off" the weaker of the bulbs 161 in the tail lights 162.

Since the switch 180 operatively connected with the clutch pedal 30 will open the circuit between terminals 215 and 216 when the clutch is depressed, the signals will not flash during normal gear shifting operations.

When the vehicle is traveling at ten miles an hour or less, the governor will cause the contacts 174 and 176 to separate, thus breaking the section of the circuit operative when the transfer switch 148 is in the solid line position of Figure 7. However, under this condition the solenoid will be de-energized and the auxiliary valves 104 will close, thus air intake will proceed through the carburetor 22. Since vacuum will return to the carburetor, the diaphragm valve will move transfer switch 148 to the broken line position of Figure 7, and the "slow" lights 160 will flash and the weaker bulbs 161 will light to warn following vehicles of the lower speed.

It should be pointed out, with regard to the operation of the solenoid 132, which when energized causes the auxiliary valves 104 to open in the conduit 58, that upon discontinuance of the section of the circuit in which the solenoid 132 is energized, or upon breaking of this circuit by the various means hereinbefore described, the spring 133 and the solenoid 132 will act to return the plunger 128 to its original position as the solenoid 132 is de-energized and thereby causing subsequent rotation of the auxiliary valves 104, so as to substantially close the conduit 58 in the selector body 46.

In addition to the operation of the safety device in response to, and in connection with the vacuum selector or economizer, economy of operation will also be accomplished when the vehicle is traveling on a downgrade, the vacuum in the carburetor will be lost causing the vacuum selector to function to open the by-pass for the carburetor whence the intake air will proceed through the by-pass and into the intake opening of the manifold. It will be appreciated that, when the intake air flows through the by-pass, no petroleum products or fuel will be carried by the intake air, hence, no petroleum products will be introduced into the motor with the result that excessive oil consumption and carbon deposits in the motor will be eliminated when the carburetor by-pass is in operation.

Essentially, there has been provided an electrical circuit comprising two separate sections. One section operable when the auxiliary pedal is not pressed or when the vehicle is traveling in a slow rate of speed to cause the lights 160 to flash for warning drivers of trailing vehicles of the reduction in speed or slow speed of the vehicle equipped with the signal system of this invention. The other section of the circuit permits the use of the usual lights during normal driving operations.

To effect the foregoing, when the gear shift lever 168 moves from neutral to place switch 166 in its "on" position, the circuit will be completed through transfer switch 148, flasher 152 also connected electrically to warning light 165, and to the caution lights 160.

To have the brake light bulbs 161 operate in the usual manner, switch 166 is connected to switch 182 on the brake pedal 32, battery 184 and to the weaker of the light bulbs 171.

During normal driving operation, when the accelerator linkage is moved to close the contacts on switch 44, the other section of the circuit will be placed in operation through governor switch 170, clutch switch 180, relay switch 156, solenoid 132, second relay switch 158 electrically connected to battery 184 and brake switch 182 to cause the caution lights to blink. Also, second relay switch 158 transmits electrical current to thermostat 94 and heater 90.

From the foregoing, it will be apparent that there has been provided a safety signal device which is operative responsive to a vacuum selector, and the operation of which is entirely automatic and is in response to the manipulation of the accelerator pedal under normal driving conditions and responsive to loss of vacuum in the carburetor when the vehicle is stopped and the motor is idling, or when the vehicle is proceeding at a speed of ten miles per hour or less.

While there are shown and described the preferred embodiments of the invention, it is to be understood that the structure is susceptible to change and modification within the practicability of the invention and, therefore, should be limited only by the scope of the claims appended hereto.

What is claimed is:

1. The combination with an internal combustion engine, an intake manifold connected in communication with said engine, a carburetor having an air intake end and an outlet end through which a combustible fuel mixture is fed into said manifold, a throttle valve in said carburetor adjacent said outlet end for controlling the flow of combustible fuel mixture into said manifold, and a remotely operated linkage operatively connected to said carburetor throttle valve for moving the valve from closed to open positions; of a fuel economizing device comprising a body portion having an opening transversely therethrough mounted on said manifold with said opening in communication with said manifold, said carburetor upstandingly mounted on said body portion with its outlet end in communication with said opening, said body portion having a longitudinal conduit therein in communication at one end with said opening, an upstanding tube mounted on said body in spaced relation to said carburetor and having its lower end in communication with said conduit, a duct open to the atmosphere adjacent one end extending across the inlet end of said carburetor and the upper end of said tube to place the carburetor and the tube in communication therewith and with the atmosphere, valve means disposed in said tube biased into closing relation with the lower end of the tube and opening against its bias in response to motor operation to place the tube in communication with said conduit in said body portion when said throttle valve is in its closed position to thereby permit air drawn into said duct to flow through said tube and into the manifold by-passing said carburetor, auxiliary valve means mounted in said conduit for rotation about an axis extending transversely of said body portion from a normal position closing said conduit to the flow of air therethrough to an open position in which air is permitted to flow through said conduit, an operating means carried by said body portion and operatively connected to said auxiliary valve means for effecting rotary movement of the latter, electrical means operatively connected to said throttle valve linkage and said operating means, said electrical means being actuated by movement of said linkage placing said throttle valve in its closed position to actuate said operating means for effecting the rotary movement of said auxiliary valve means from its closed position to its open position, and a heating element arranged within said tube above said valve means and operatively connected to said electrical means to operate upon actuation of said electrical means for heating air flowing through said tube.

2. The combination with an internal combustion engine, an intake manifold connected in communication with said engine, a carburetor having an air intake end and an outlet end through which a combustible fuel mixture is fed into said manifold, a throttle valve in said carburetor adjacent said outlet end for controlling the now of combustible fuel mixture into said manifold, and a remotely operated linkage operatively connected to said carburetor throttle valve for moving the valve from closed to open positions; of a fuel economizing device comprising a body portion having an opening transversely therethrough mounted on said manifold with said opening in communication with said manifold, said carburetor upstandingly mounted on said body portion with its outlet end in communication with said opening, said body portion having a longitudinal conduit therein in communication at one end with said opening, an upstanding tube mounted on said body in spaced relation to said carburetor and having its lower end in communication with said conduit, a duct open to the atmosphere adjacent one end extending across the inlet end of said carburetor and the upper end of said tube to place the carburetor and the tube in communication therewith and with the atmosphere, valve means disposed in said tube biased into closing relation with the lower end of the tube and opening against its bias in response to motor operation to place the tube in communication with said conduit in said body portion when said throttle valve is in its closed position to thereby permit air drawn into said duct to flow through said tube and into the manifold by-passing said carburetor, auxiliary valve means mounted in said conduit for rotation about an axis extending transversely of said body portion from a normal position closing said conduit to the flow of air therethrough to an open position in which air is permitted to flow through said conduit, an operating means carried by said body portion and operatively connected to said auxiliary valve means for effecting rotary movement of the latter, and electrical means operatively connected to said throttle valve linkage and said operating means, said electrical means being actuated by movement of said linkage placing said throttle valve in its closed position to actuate said operating means for effecting the rotary movement of said auxiliary valve means from its closed position to its open position.

3. The combination with an internal combustion engine, an intake manifold connected in communication with said engine, a carburetor having an air intake end and an outlet end through which a combustible fuel mixture is fed into said manifold, a throttle valve in said carburetor adjacent said outlet end for controlling the flow of combustible fuel mixture into said manifold, and a remotely operated linkage operatively connected to said carburetor throttle valve for moving the valve from closed to open positions; of a fuel economizing device comprising a body portion having an opening transversely therethrough mounted on said manifold with said opening in communication with said manifold, said carburetor upstandingly mounted on said body portion with its outlet end in communication with said opening, said body portion having a longitudinal conduit therein in communication at one end with said opening, an upstanding tube mounted on said body in spaced relation to said carburetor and having its lower end in communication with said conduit, a duct open to the atmosphere adjacent one end extending across the inlet end of said carburetor and the upper end of said tube to place the carburetor and the tube in communication therewith and with the atmosphere, valve means disposed in said tube biased into closing relation with the lower end of the tube and opening against its bias in response to motor operation to place the tube in communication with said conduit in said body portion when said throttle valve is in its closed position to thereby permit air drawn into said duct to flow through said tube and into the manifold by-passing said carburetor, auxiliary valve means mounted in said conduit for rotation about an axis extending transversely of said body portion from a normal position closing said conduit to the flow of air therethrough to an open position in which air is permitted to flow through said conduit, an operating means carried by said body portion and operatively connected to said auxiliary valve means for effecting rotary movement of the latter, electrical means operatively connected to said throttle valve linkage and said operating means, said electrical means being actuated by movement of said linkage placing said throttle valve in its closed position to actuate said operating means for effecting the rotary movement of said auxiliary valve means from its closed position to its open position, said operating means including a solenoid carried by said body portion at one end thereof and operatively connected to said electrical means, a plunger carried by said solenoid and projecting outward through one end thereof toward the other end of said body portion, a gear toothed rack secured at one end to the free end of said plunger to extend longitudinally therefrom, a gear mounted for rotary movement about said axis of said auxiliary valve means to impart rotary movement to the latter and operatively engaging said rack, said plunger mounted to move in a rectilinear path toward and away from said gear upon actuation of said electrical means energizing said solenoid so that said rack will move with said plunger and impart rotary movement to said gear and thereby cause the rotary movement of said auxiliary valve means, a heating element arranged within said tube above said valve means and operatively connected to said electrical means to operate upon actuation of said electrical means for heating air flowing through said tube.

References Cited in the file of this patent

UNITED STATES PATENTS

| | | |
|---|---|---|
| Re. 23,719 | Coombs | Oct. 6, 1953 |
| 1,156,453 | Banes | Oct. 12, 1915 |
| 1,887,515 | Pulkinghorn | Nov. 15, 1932 |
| 2,035,775 | Vander Veer | Mar. 31, 1936 |
| 2,046,389 | Kushinsky | July 7, 1936 |
| 2,128,769 | Finnell | Aug. 30, 1938 |
| 2,250,133 | Pearce | July 22, 1941 |
| 2,250,587 | Larson | July 29, 1941 |
| 2,724,375 | Schaffer | Nov. 22, 1955 |
| 2,733,696 | Schneider | Feb. 7, 1956 |